Figure 6:
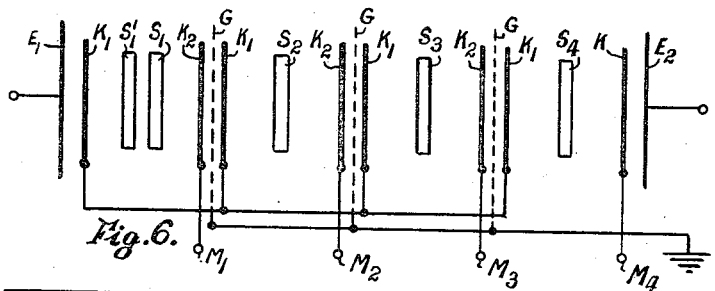

July 17, 1951  M. M. LEVY  2,560,772
MULTICHANNEL PULSE SIGNALING SYSTEM
Filed March 15, 1949  2 Sheets-Sheet 1
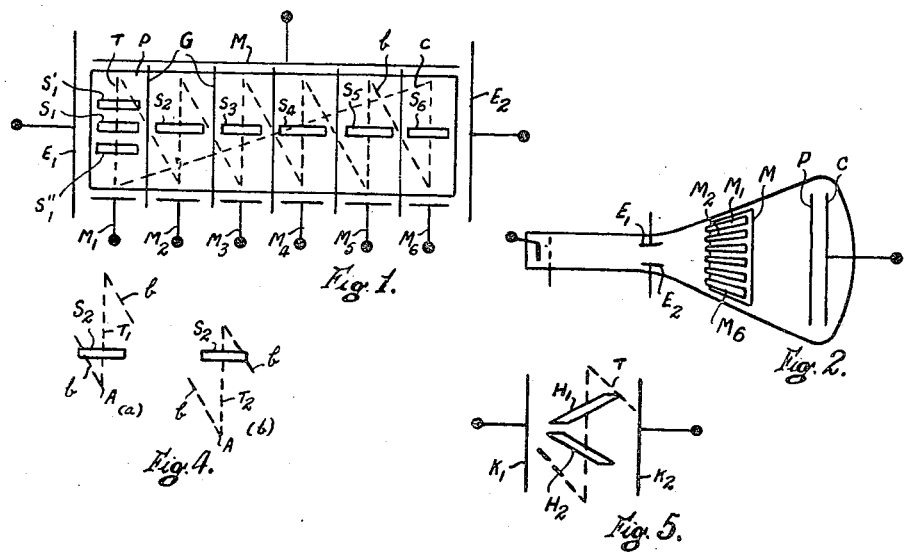
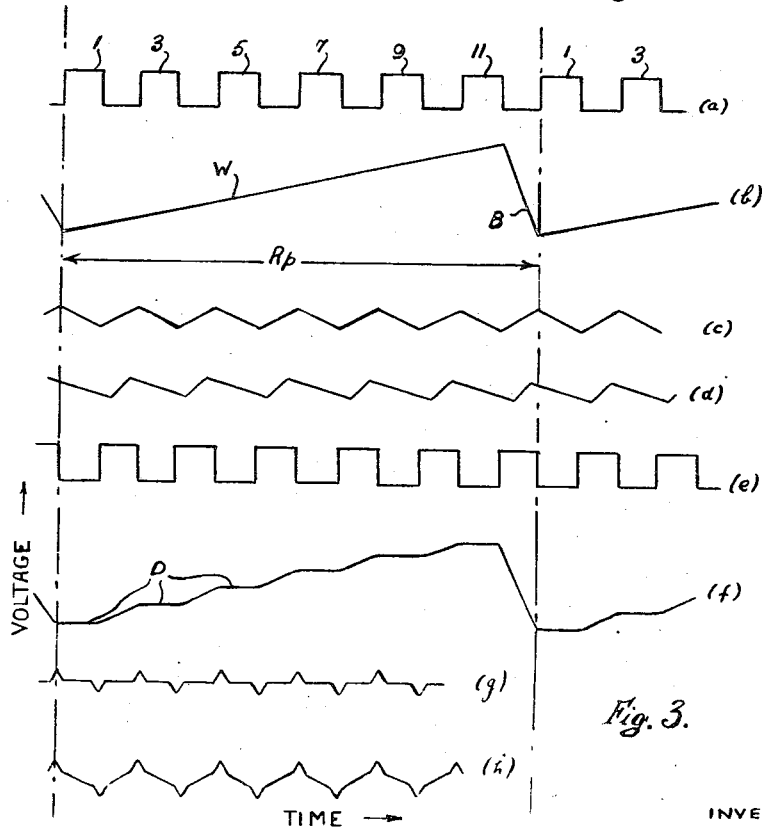
INVENTOR
MAURICE MOISE LEVY
BY
ATTORNEY July 17, 1951           M. M. LEVY           2,560,772

MULTICHANNEL PULSE SIGNALING SYSTEM

Filed March 15, 1949           2 Sheets-Sheet 2

INVENTOR
MAURICE MOISE LEVY
BY
ATTORNEY

Patented July 17, 1951

2,560,772

UNITED STATES PATENT OFFICE 2,560,772

MULTICHANNEL PULSE SIGNALING SYSTEM

Maurice Moise Levy, Earls Court, England, assignor to The General Electric Company, Limited, London, England Application March 15, 1949, Serial No. 81,519
In Great Britain March 16, 1948

9 Claims. (Cl. 332—13)

The present invention relates to multi-channel pulse signalling systems. It is concerned with apparatus for modulating pulses in time or width, the apparatus being of the type comprising a cathode ray tube, deflecting means for causing the cathode ray beam to sweep successively and recurrently over a plurality of slots or strips to generate pulses having the time of occurrence of its leading or trailing edge, or of both such edges, determined by an edge or by edges of one of the slots or strips, and modulating means for varying the instant at which the beam crosses the said edge or edges of each slot or strip in accordance with the instantaneous value of the modulating voltage of a different channel.

One known system of this type for time-modulation employs a plate having a number of slots over which the cathode ray beam is caused to move in a circular path, the slot being inclined relatively to the tangent to the path at a suitable angle of, for example, 45°. Electrons passing through the slot are collected by a collecting electrode. Each slot corresponds to one channel, and as the beam comes into the vicinity of any one slot, it comes under the influence of a modulating electrode which varies the radius of its path. Modulating voltages applied to these modulating electrodes thus serve to deflect the beam inwards and outwards in accordance with the modulating voltages of the respective channels, and thus vary the instants at which the beam crosses the leading and trailing edges of the slots. When the beam traverses a slot a negative pulse is generated at the collecting electrode and the leading and trailing edges of this pulse are determined by the instants at which the beam crosses the leading and trailing edges of the corresponding slot, and consequently upon the instantaneous value of the modulating voltage.

If negative-going output pulses are required, they can be taken from the collecting electrode, and if positive-going pulses are required, they can be taken from the slotted plate. It is evident that the slot can be replaced by a strip which serves to interrupt the flow of electrons to the collecting electrode, positive pulses then being obtainable from the collecting electrode and negative pulses from the strip. The collecting electrode can if desired be dispensed with if negative pulses are required.

Where width modulation is required instead of time-modulation, the slots or strips may be replaced by apertures or plates of triangular shape.

It is evident that with the apparatus described, the length of each slot projected upon the mean path of the beam must be great enough to accommodate the maximum time variation produced by modulation of the pulse or what is known as the channel-width. Where the repetition frequency is high and the number of channels large, it is evident that with this known arrangement a large cathode ray tube is required. Moreover the phase of the oscillations used to produce the rotary movement of the beam must be maintained constant if variation in the time of occurrence of pulses, independent of the modulation, is to be avoided.

The principal object of the present invention is to provide pulse-modulating apparatus which for a given recurrence frequency, number of channels and constancy of phase of beam deflecting oscillations can be of smaller size than known apparatus.

According to the present invention, there is provided apparatus of the type set forth, wherein the said deflecting means, or additional deflecting means, are arranged to reduce, preferably to zero, the component of movement of the beam in a direction parallel to or concentric with the line joining the centers of the slots or strips when the beam is in the neighbourhood of the slots or strips. Means may be provided for deflecting the beam in a direction transverse with respect to the said line to cross each slot or strip, the modulating means being arranged to deflect the beam either along or transversely with respect to the said line according to the shape and disposition of the slots or strips. The slots or strips are preferably arranged with their longitudinal axes along said line. Alternatively the deflections of the beam may be caused to reverse direction in steps.

Figure 7:
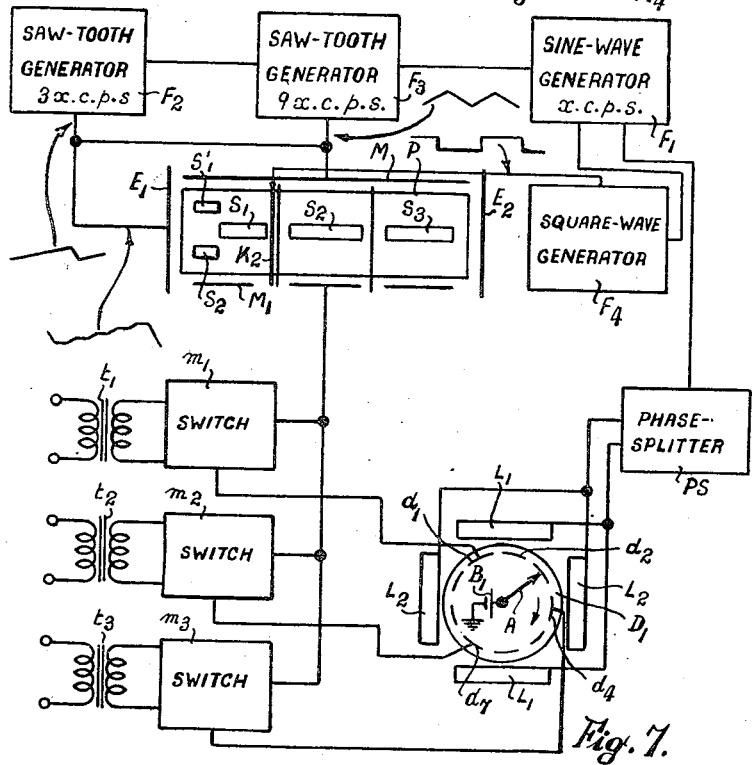
Figure 8:
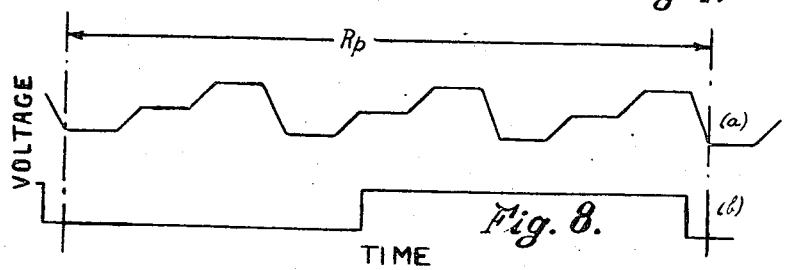

The invention will be described by way of example with reference to the accompanying drawing in which:

Figure 1 illustrates diagrammatically one arrangement of slots and deflecting electrodes that may be used in carrying out the invention, Figure 2 shows how the arrangement of Fig. 1 may be disposed in a cathode ray tube, Figure 3 contains waveforms of voltages that may be used at various points in the arrangement of Fig. 1, voltage being plotted as ordinate against time as abscissa, Figure 4 illustrates the effect of modulation in the arrangement of Fig. 1, Figure 5 shows an alternative form that the slots may take, Figure 6 illustrates a modification of the arrangement of Figure 1, Figure 7 is a circuit diagram of an arrangement according to the invention employing a modified form of the device of Figures 1 and 2, and Figure 8 shows wave forms used in the circuit of Figure 7.

Referring to Figure 1, this is a view of an arrangement within the cathode ray tube of Fig. 2 viewed along the axis of the tube from the cathode. The arrangement comprises a plate P having therein slots $S_1$, $S_2$, $S_3$ and so on. The slot $S_1$ may be associated with two further solts $S_1'$ and $S_1''$ as shown for a purpose to be described later. The arrangement to be described is assumed to be suitable for a twelve-channel system. The particular arrangement shown in Fig. 1 is intended to deal with the odd-numbered channels and a similar arrangement would be employed to deal with the even-numbered channels.

Referring now to Figure 3, the various voltage wave-forms shown may be generated in any known or suitable manner. The voltage at $a$ is a square wave having a frequency equal to the channel pulse recurrence frequency multiplied by half the number of channels, in this case, the channel pulse recurrence frequency multiplied by six. The channel pulse recurrence period is indicated in Figure 3 by $R_p$. The waveform at $a$ defines the channel width. Thus the odd-numbered channels with which the arrangement of Figs. 1 and 2 is intended to deal are defined by the pulses marked 1, 3, 5 etc. at $a$. The waveform at $b$ in Fig. 3 is an unsymmetrical saw-tooth waveform having a substantially linear rising portion W which constitutes the working stroke, followed by a relatively rapid return stroke B. The waveform at $c$ is a symmetrical saw-tooth waveform of the same frequency as that represented at $a$. The waveform at $d$ will be referred to later. That at $e$ is the same as that at $a$, reversed in sign. The waveform at $f$ is the sum of the waveforms at $b$ and $c$.

A voltage having the waveform at $f$ in Figure 3 is applied between two deflecting electrodes $E_1$ and $E_2$ in Figs. 1 and 2 to deflect the cathode ray beam along the line of the slots $S_1$, $S_2$, etc. It will be noted that the waveform at $f$ has portions D extending over the channel periods 1, 3, 5, etc., during which there is no change in the deflecting voltage. For this reason the beam is caused to move across the plate P in steps separated by intervals when the beam comes to rest. In Figs. 1 and 2 there are also provided a deflecting electrode M and further deflecting electrodes $M_1$, $M_2$, etc., one of the latter being associated with each of the slots $S_1$, $S_2$, etc. These electrodes serve to deflect the ray in a direction at right angles to the line of the slots $S_1$, $S_2$, etc. To the electrode M is applied the waveform shown at $c$ Fig. 3 and to the electrodes $M_1$, $M_2$, etc. are applied modulating voltages of the channels 1, 3, 5, etc.

Assuming that no modulating voltages are applied to the electrodes $M_1$, $M_2$, etc. the effect of the voltages applied between $E_1$ and $E_2$ and to M will be to cause the ray to follow the track indicated by the broken line T in Fig. 1. The effect of the modulating voltage applied to the electrodes $M_1$, $M_2$, etc. is shown in Fig. 4. In Fig. 4 there is shown at $a$ the condition when the modulating voltage applied to the electrode $M_2$ has a maximum negative value and at $b$ the position when this voltage has a maximum positive value. It is seen that the effect of the modulating voltage is to displace the track T, as shown at $T_1$ and $T_2$ respectively, bodily relatively to the slot $S_2$. The point A at which the working stroke (that during which the beam crosses a slot) commenses (say) is fixed in time and is shifted in space by the modulating voltage. Consequently the instant at which the beam crosses the slot $S_2$ is dependent upon the modulating voltage.

It is either necessary to arrange that the return strokes of the track indicated by $b$ in Figs. 1 and 4 and those represented by $c$ in Fig. 1 do not pass over the slots or else, preferably, the beam is suppressed during the return strokes $b$ and $c$. The suppression may be effected by applying a waveform such as that at $e$ in Fig. 3 to the cathode of the cathode ray tube or a waveform as at $a$ in Fig. 3 to the control grid.

Instead of the voltage applied between electrodes $E_1$ and $E_2$ being of the form shown at $f$ in Fig. 3, namely that at $b$ combined with that at $c$, there may be used a voltage formed by combining $b$ with $d$. The effect of this is to increase the duration of the working stroke in comparison with the duration of the return stroke. In this way it may be possible to make the speed of movement of the cathode ray beam during that part of the working stroke which is material, that is to say the part that occurs during a channel period, more constant than when the symmetrical waveform at $c$ in Figure 3 is used.

Screens such as are shown at G in Figure 1 may be provided between the modulating electrodes $M_1$, $M_2$, etc. in order to prevent interaction between adjacent channels. These screens are not shown in Figure 2.

There is the possibility of over-modulation causing the beam not to pass over a slot $S_1$, $S_2$, etc., and to reduce the chance of this occurring there may be combined with the waveform shown at $c$ or $d$ in Figure 3 a waveform of the character shown at $g$ in Fig. 3. The resultant of the waveforms at $c$ and $g$ is shown at $h$ in Fig. 3. Other waveforms than that at $g$ may be used for the same purpose.

In Fig. 1 the deflecting electrode $E_1$ is arranged to co-operate with three slots $S_1$, $S_1'$ and $S_1''$. These three slots produce three pulses which may be used for synchronising purposes. The electrode $M_1$ does not serve to apply modulating signal voltage but voltage may be applied to this electrode to adjust the precise phase in which the synchronising pulses are transmitted. Of course the synchronising signal may be of any other kind than the three pulses produced by three slots so long as it is readily separable from the channel pulses.

In the known modulating apparatus already referred to, any error in phase of the current or voltage serving to produce the sweeping movement of the beam over a slot gives rise to error in the timing of the pulses generated. Errors in the precise phasing of the oscillation shown at $b$ in Fig. 3 applied to electrodes $E_1$ and $E_2$, on the other hand, will only result in a shift of the track T to the right or left in Fig. 1, and provided the shift is not so great that the track fails to traverse the slot, such shift will not be material. For a given error in phasing, a given pulse recurrence frequency and a given number of channels, it will be evident that the arrangement shown in Fig. 1 can be made substantially more compact than the known arrangement referred to.

Many variations of the form of the invention shown in Fig. 1 are possible, and some of these will now be indicated. As shown in Fig. 5, for each channel there may be provided two slots $H_1$ and $H_2$ and modulating voltages may be applied between electrodes $K_1$ and $K_2$. The beam is caused to sweep in a zigzag path as described with reference to Fig. 1 along a track T and the electrodes $K_1$ and $K_2$ serve to deflect the beam in the same direction as that in which the electrodes $E_1$ and $E_2$ of Fig. 1 deflect it, that is to say, the vertical portion of the track T in Fig. 5 is caused to move to the left and right by the modulating voltages. The result is to produce pairs of pulses whose spacing is dependent upon the instantaneous value of the modulating voltage. By dispensing with one of the slots $H_1$ and $H_2$ there can be generated single time-modulated pulses.

In another arrangement according to the invention, in Figure 6, the slots are arranged with their lengths perpendicular to the line joining the centres of the slots. In this case only two synchronising slots $S_1$ and $S_1'$ are shown. A voltage having the waveform shown at $f$ in Fig. 3 may be applied to electrodes $E_1$ and $E_2$ and a voltage such as that at $c$ in Fig. 3 may be applied to electrodes $K_1$ which are connected in parallel, modulating voltages being applied to electrodes $K_2$ from terminals $M_1$, $M_2$, etc. All the deflection of the beam is thus in the direction of the centre-line of the slots, and time-modulated pulses are generated. It will be evident that instead of applying the waveforms at $f$ and $c$ to separate electrodes, they may be applied to the same electrode.

In this case it will be noted that the cathode ray beam not only comes to rest but reverses direction in the vicinity of each slot. The beam traverses each slot from left to right and from right to left in Fig. 6, and thus generates pairs of pulses whose time spacing represents the modulating voltage, as described with reference to Fig. 5. If normal time-modulated pulses are desired, a voltage of the wave-form shown in Fig. 3a may be applied to the cathode or control electrode of the cathode ray tube to suppress the beam during one traversal of each slot. Screens as indicated in broken lines at G may be provided between deflecting electrodes $K_1$ and $K_2$, these screens being connected to a point of fixed potential, for instance they may be grounded. As in Fig. 2, the electrodes $E_1$ and $E_2$ are arranged to co-operate with a different part of the beam from that influenced by the deflecting electrodes $K_1$ and $K_2$ which may be arranged in a similar position along the beam track to the electrodes $M_1$, $M_2$ etc. in Fig. 2.

It may be arranged, in the manner generally described in the specification of Patent Application Serial No. 55,732 filed by Maurice Moise Levy and Dennis Clark Espley on October 21, 1948, that each slot acts as a modulating slot for a plurality of different channels in succession, thereby reducing the number of slots needed for a given number of channels. In the example to be described with reference to Fig. 7 only three slots are shown, although of course the number might be much greater. Similarly each slot is assumed to deal with three channels and, again, the number might be much greater. This simple example, therefore, is capable of dealing with nine channels, for instance the odd or even channels of an eighteen channel system. Like parts are given the same references as in Figs. 1 and 2.

In this example it is arranged that a synchronising signal, consisting in this case of a pair of pulses generated by two slots $S_1'$ and $S_1''$, is generated once per channel pulse recurrence period and that when the beam passes under the influence of the electrode $M_1$ at other times it is arranged to sweep over a slot $S_1$, the electrode $M_1$ then having modulating voltages applied to it.

A master oscillation generator $F_1$ generates a sinusoidal oscillation at $x$ C. P. S. and this oscillation is fed to control the generation of an unsymmetrical saw-tooth oscillation at $3x$ C. P. S. by a generator $F_2$ and a symmetrical saw-tooth oscillation at $9x$ C. P. S. by a generator $F_3$. The oscillation from $F_2$ is of the form shown at $b$ in Fig. 3 (but of three times the frequency in relation to the channel recurrence frequency) and that from $F_3$ is of the form shown at $c$ in Fig. 3. These two oscillations are fed together to electrode $E_1$; they have the wave-form shown at $a$ in Fig. 8. The oscillation from $F_3$ is applied alone to the electrode M. A square wave generator $F_4$ is arranged to generate a rectangular wave at $x$ C. P. S. of the form shown at $b$ in Fig. 8 under the control of the master oscillator $F_1$ and this wave is applied to an electrode $K_2$ disposed in the same way as each electrode $K_2$ in Fig. 6. Its effect is to cause the track of the beam to pass over slot $S_1$ during two successive traversals and to pass over slots $S_1'$, $S_1''$ during the third traversal in each channel period.

By means of a phase splitter PS there are generated from the oscillations from the master oscillator $F_1$ oscillations in phase quadrature which are applied to coils $L_1$ and $L_2$ of a distributor $D_1$ which may be a cathode ray distributor to cause the contact arm A or cathode ray beam to sweep over nine electrodes $d_1$, $d_2$ etc. and connect these electrodes successively to a voltage source represented by a battery $B_1$. The voltage pulses so generated at the electrodes $d_1$, $d_2$ etc. are each applied to actuate a switch: only the three switches $m_1$, $m_2$ and $m_3$ associated with modulating electrode $M_2$ are shown and it is to be understood that like switches are associated with electrodes $M_1$ and $M_3$. Modulating voltages from channels 1, 7 and 13 are applied through transformers $t_1$, $t_7$ and $t_{13}$ respectively and through the switches $m_1$, $m_2$ and $m_3$ respectively to the electrode $M_2$.

In operation the cathode ray beam sweeps over the slots $S_1$, $S_2$, $S_3$ along a track corresponding approximately to that shown at T in Fig. 1. During the first sweep the electrode $M_2$ has a voltage dependent upon the instantaneous value of the modulation of channel 1. During the next sweep the voltage on the electrode $M_2$ corresponds to the modulation of channel 7 and during the next sweep it corresponds to the modulation of channel 13. The cycle then repeats. Similarly the voltage on the electrode $M_3$ corresponds in successive sweeps to the modulation of channels 3, 9 and 15.

Two of the three switches corresponding to $m_1$ etc., associated with the electrode $M_1$, serve to apply modulating signals from say channels 5 and 11 at appropriate times to the electrode $M_1$ whilst the third switch serves to maintain the electrode $M_1$ at a fixed potential so that synchronising pulses of constant phase are generated.

The arrangement of Fig. 7 can clearly be used with a cathode ray tube operated in accordance with Fig. 6.

In the arrangements described, both the leading and the trailing edges of the pulses are determined by the edges of the slots $S_1$, $S_2$ etc. If desired, when generating width-modulated pulses, the slots may be of much greater width and the leading or trailing edge only is arranged to be determined by the instants of crossing one edge of such a wide slot. The other edge may be determined by a black-out pulse of the form shown at $a$ or $e$ in Fig. 3 applied to the cathode or control electrode to switch the beam on or off at regularly recurrent instants to determine the unmodulated leading or trailing edge.

It is evident that $S_1$, $S_2$ etc. in the various figures may be regarded as conducting strips instead of slots. Negative-going pulses may be taken from such strips or positive-going pulses may be taken from a collector electrode C (Fig. 1) arranged to collect electrons not intercepted by the strips.

The invention may be applied to slots arranged around a circle, suitable voltages being fed to deflect the ray in a circular path and to cause it to come to rest, or substantially to rest, in the vicinity of each slot. Since the voltages required for this purpose are of complex waveform, this arrangement is not at present a preferred one.

It will be evident that in all the examples given the slots may be replaced by strips of the same shape.

I claim:

1. Pulse-signalling apparatus comprising a cathode ray tube, electron intercepting means located within said tube and having a plurality of edges to define instants of commencement and cessation of electron collection by said intercepting means, said edges being disposed in a succession symmetrically with respect to a track having working strokes during which the track crosses edges and return strokes during which the track moves from one edge to another edge without crossing edges, deflecting electrode means for deflecting the cathode ray beam in a direction along said track during return strokes, means for generating a deflecting voltage of stepped sawtooth wave form having portions of constant voltage separated by portions of progressively changing voltage, means to apply said deflecting voltage to said deflecting electrode means whereby to cause said beam to move in steps along said track during return strokes, means to deflect said beam to vary the instants of crossing of said edges during working strokes in dependence upon voltages applied to such means, and connections to apply signal voltages to the last said means.

2. Pulse-signalling apparatus comprising a plurality of sources of modulating signals of different channels, a cathode ray tube, a plurality of electron-intercepting regions, means to deflect the cathode ray beam to traverse edges of said regions successively and recurrently along tracks perpendicular to such edges, modulating means associated with each of said regions for displacing said tracks in directions along their lengths, means for applying modulating signals from said sources to said modulating means respectively, and means to derive from traversals of said edges pulses modulated in correspondence with said signals respectively.

3. Pulse-signalling apparatus comprising a plurality of sources of modulating signals of different channels, a cathode ray tube, electron-intercepting means disposed within said tube and having a plurality of edges to define instants of commencement and cessation of electron collection by said intercepting means, means to deflect the cathode ray beam to traverse said edges successively and recurrently along tracks perpendicular to said edges, modulating means associated with each said edge to displace said tracks in directions along their lengths in accordance with voltages applied thereto, and means to apply modulating signal voltages from said sources to said modulating means respectively.

4. Pulse-signalling apparatus comprising a plurality of sources of modulating signals of different channels, a cathode ray tube, an electron-intercepting plate located within said tube and having a plurality of elongated apertures, means to deflect the cathode ray beam in a direction parallel to the lengths of said apertures, means to retard said deflection of said beam in the vicinity of each of said apertures, means to deflect said beam in a direction at right angles to the lengths of said apertures during the periods of said retardation thereof to cross said apertures, modulating means associated with said apertures respectively to deflect said beam in the last named directions in accordance with voltage applied thereto to vary the instants at which said beam crosses said apertures respectively and means to apply signal voltage from said sources to said modulating means respectively.

5. Apparatus according to claim 4, wherein said means to deflect said beam in a direction parallel to the lengths of said apertures and said retarding means comprise deflecting electrode means positioned to deflect said beam along said lengths, means to generate a deflecting voltage of stepped saw-tooth wave form having portions of constant voltage separated by portions of changing voltage and means to apply said deflecting voltage to said deflecting electrode means.

6. Pulse-signalling apparatus comprising a plurality of sources of modulating signals of different channels, a cathode ray tube, a plurality of electron-intercepting, elongated, conducting strips located within said tube, means to deflect the cathode ray beam in a direction parallel to the lengths of said strips, means to retard said deflection of said beam in the vicinity of each of said strips, means to deflect said beam in a direction at right angles to the lengths of said strips during the periods of said retardation thereof to cross said strips, modulating means associated with said strips respectively to deflect said beam in the last-named directions in accordance with voltage applied thereto to vary the instants at which said beam crosses said strips respectively and means to apply signal voltage from said sources to said modulating means respectively.

7. Apparatus according to claim 6, wherein said means to deflect said beam in a direction parallel to the lengths of said strips and said retarding means comprise deflecting electrode means positioned to deflect said beam along said lengths, means to generate a deflecting voltage of stepped saw-tooth wave form having portions of constant voltage separated by portions of changing voltage, and means to apply said deflecting voltage to said deflecting electrode means.

8. Pulse-signalling apparatus comprising a cathode ray tube, an electron-intercepting plate within said tube, said plate having therein a first signal-generating aperture, a plurality of other signal-generating apertures, and at least one synchronising signal aperture disposed close to said first signal-generating aperture, means to deflect the cathode ray beam recurrently in a zig-zag path over said signal-generating apertures, modulating means associated with each signal-generating aperture to vary the instants at which the beam crosses such aperture in accordance with the voltage applied to such means, a plurality of sources of channel signals greater than the number of said signal-generating apertures, distributor means for applying voltage from a plurality of said sources in succession to each of said modulating means, and means to periodically displace said path from said first signal-generating aperture to said synchronising signal aperture.

9. Pulse-signalling apparatus comprising a cathode ray tube, a first electron-intercepting signal-generating strip, a plurality of other electron-intercepting signal-generating strips, and at least one electron-intercepting synchronising-signal strip disposed close to said first signal-generating strip, all said strips being disposed within said tube, means to deflect the cathode ray beam recurrently in a zig-zag path over said signal-generating strips, modulating means associated with each signal-generating strip to vary the instants at which the beam crosses such strip in accordance with the voltage applied to such means, a plurality of sources of channel signals greater than the number of said signal-generating strips, distributor means for applying voltage from a plurality of said sources in succession to each of said modulating means, and means to periodically displace said path from said first signal-generating strip to said synchronizing signal strip.

MAURICE MOISE LEVY.

REFERENCES CITED

The following references are of record in the file of this patent:

UNITED STATES PATENTS

| Number | Name | Date |
|---|---|---|
| 2,250,528 | Gray | July 29, 1941 |
| 2,250,819 | Wolf | July 29, 1941 |
| 2,265,216 | Wolf | Dec. 9, 1941 |
| 2,429,631 | Labin et al. | Oct. 28, 1947 |